(12) United States Patent
James et al.

(10) Patent No.: US 11,807,390 B2
(45) Date of Patent: Nov. 7, 2023

(54) AIRCRAFT LANDING

(71) Applicants: AIRBUS OPERATIONS LIMITED, Bristol (GB); AIRBUS OPERATIONS SAS, Toulouse (FR)

(72) Inventors: Dylan Benedict James, Bristol (GB); Fraser Wilson, Bristol (GB); Franck Flourens, Bristol (GB)

(73) Assignees: Airbus Operations Limited, Bristol (GB); Airbus Operations (SAS), Toulouse (FR)

( * ) Notice: Subject to any disclaimer, the term of this patent is extended or adjusted under 35 U.S.C. 154(b) by 793 days.

(21) Appl. No.: 16/523,170

(22) Filed: Jul. 26, 2019

(65) Prior Publication Data
US 2020/0031494 A1    Jan. 30, 2020

(30) Foreign Application Priority Data
Jul. 27, 2018  (GB) ..................... 1812301

(51) Int. Cl.
| | |
|---|---|
| *B64D 45/04* | (2006.01) |
| *B64C 25/00* | (2006.01) |
| *G01S 1/04* | (2006.01) |
| *G01S 13/91* | (2006.01) |
| *G08G 5/02* | (2006.01) |

(52) U.S. Cl.
CPC ............ *B64D 45/04* (2013.01); *B64C 25/001* (2013.01); *G01S 1/042* (2013.01); *G01S 13/913* (2013.01); *G08G 5/02* (2013.01)

(58) Field of Classification Search
CPC ....... B64D 45/04; B64C 25/001; G01S 1/042; G01S 13/913; G08G 5/02

USPC ........................................... 342/33
See application file for complete search history.

(56) References Cited

U.S. PATENT DOCUMENTS

| | | | | |
|---|---|---|---|---|
| 3,587,102 A | * | 6/1971 | Czerwinski | H01Q 1/28 |
| | | | | 343/788 |
| 3,623,093 A | * | 11/1971 | Bollard | G01S 13/87 |
| | | | | 342/26 B |
| 3,662,392 A | * | 5/1972 | Stapleton | G01S 1/02 |
| | | | | 343/768 |
| 4,007,970 A | * | 2/1977 | Romero | B60T 8/1703 |
| | | | | 303/20 |
| 4,509,709 A | * | 4/1985 | Utton | B64C 1/36 |
| | | | | 343/705 |
| 5,695,157 A | * | 12/1997 | Coirier | G05D 1/0676 |
| | | | | 244/175 |

(Continued)

FOREIGN PATENT DOCUMENTS

| | | | | |
|---|---|---|---|---|
| EP | 1065519 A1 | * | 1/2001 | ........... F41G 7/2226 |
| EP | 3 127 818 | | 2/2017 | |

(Continued)

*Primary Examiner* — Nuzhat Pervin
(74) *Attorney, Agent, or Firm* — Nixon & Vanderhye P.C.

(57) ABSTRACT

A system 100 to detect aircraft ground proximity including: a transmitter 110 for transmitting a radio frequency signal along an extended landing gear 20 of an aircraft 10, a sensor 120 configured to detect a parameter of the radio frequency, and a controller 130 configured to detect a change in the detected parameter on the basis of an output of the sensor 120, and to issue a landing signal when the change in the detected parameter meets a predetermined criterion. The predetermined criterion is indicative of a certain aircraft ground proximity.

20 Claims, 5 Drawing Sheets

(56) References Cited

U.S. PATENT DOCUMENTS

| | | | | |
|---|---|---|---|---|
| 5,831,570 A * | 11/1998 | Ammar | | F41G 7/2246 |
| | | | | 342/149 |
| 6,008,742 A * | 12/1999 | Groves | | G08G 5/0095 |
| | | | | 340/963 |
| 7,587,278 B2 * | 9/2009 | Poe | | G08G 5/065 |
| | | | | 340/961 |
| 8,108,086 B2 * | 1/2012 | Bailly | | G08G 5/0056 |
| | | | | 701/14 |
| 8,514,105 B1 * | 8/2013 | Spencer, V | | G01C 23/00 |
| | | | | 342/65 |
| 8,788,128 B1 * | 7/2014 | McCusker | | G01S 13/935 |
| | | | | 701/4 |
| 9,187,173 B2 * | 11/2015 | Morris | | B64C 27/02 |
| 9,207,319 B2 * | 12/2015 | Starr | | G01S 13/93 |
| 10,202,204 B1 * | 2/2019 | Daidzic | | B64C 5/02 |
| 11,042,831 B2 * | 6/2021 | Burch, V | | B64U 50/19 |
| 2003/0011493 A1 * | 1/2003 | Wiplinger | | B64C 25/28 |
| | | | | 340/960 |
| 2005/0046558 A1 * | 3/2005 | Buenz | | G01P 3/44 |
| | | | | 340/445 |
| 2005/0182530 A1 * | 8/2005 | Murphy | | G01S 19/48 |
| | | | | 701/4 |
| 2005/0254613 A1 * | 11/2005 | Gochnour | | G21B 1/00 |
| | | | | 376/100 |
| 2007/0131505 A1 * | 6/2007 | Kim | | B60L 5/005 |
| | | | | 191/14 |
| 2008/0033607 A1 * | 2/2008 | Zeliff | | B64D 45/0005 |
| | | | | 701/31.4 |
| 2010/0017050 A1 * | 1/2010 | Watts | | B64D 45/04 |
| | | | | 701/16 |
| 2010/0121504 A1 * | 5/2010 | Jones | | G07C 5/008 |
| | | | | 701/16 |
| 2013/0325221 A1 * | 12/2013 | Shue | | G05D 1/0676 |
| | | | | 701/16 |
| 2014/0027567 A1 * | 1/2014 | Onomichi | | B64C 25/50 |
| | | | | 244/50 |
| 2014/0062756 A1 * | 3/2014 | Lamkin | | G01S 7/04 |
| | | | | 342/29 |
| 2015/0012195 A1 * | 1/2015 | Georgin | | B64C 25/42 |
| | | | | 701/70 |
| 2015/0142388 A1 * | 5/2015 | Metzger | | G08G 5/0021 |
| | | | | 702/189 |
| 2015/0204399 A1 * | 7/2015 | Schmidt | | F16D 49/00 |
| | | | | 188/161 |
| 2015/0268084 A1 * | 9/2015 | Southern | | B64C 25/60 |
| | | | | 188/269 |
| 2015/0291287 A1 * | 10/2015 | Greene | | G05D 1/0055 |
| | | | | 701/18 |
| 2015/0332593 A1 * | 11/2015 | Munns | | G01C 5/005 |
| | | | | 701/120 |
| 2016/0244183 A1 * | 8/2016 | Suokas | | B64D 45/0005 |
| 2017/0137144 A1 * | 5/2017 | Georgin | | G08G 5/065 |
| 2017/0370786 A1 * | 12/2017 | Mastrianni | | G01B 11/16 |
| 2018/0076664 A1 * | 3/2018 | Wright | | H02J 50/10 |
| 2018/0086439 A1 * | 3/2018 | Thompson | | B64C 25/00 |
| 2018/0162555 A1 * | 6/2018 | Lin | | B64F 1/364 |
| 2018/0233810 A1 * | 8/2018 | Sun | | H01Q 9/42 |
| 2018/0330625 A1 * | 11/2018 | Georgin | | B64D 45/04 |
| 2020/0010179 A1 * | 1/2020 | Liu | | B64C 1/36 |

FOREIGN PATENT DOCUMENTS

| | | | | |
|---|---|---|---|---|
| EP | 3127818 A1 * | 2/2017 | | B64C 25/28 |
| EP | 3 208 680 | 8/2017 | | |
| EP | 3208680 A1 * | 8/2017 | | B64C 13/503 |
| GB | 1 430 304 | 3/1976 | | |
| GB | 1430304 A * | 3/1976 | | H01Q 1/28 |
| JP | 4891409 B2 * | 3/2012 | | H01Q 1/283 |
| JP | 4966380 B2 * | 7/2012 | | H01Q 1/283 |
| WO | WO-2009153436 A1 * | 12/2009 | | G05B 23/0254 |
| WO | WO-2017016439 A1 * | 2/2017 | | B64C 39/024 |

* cited by examiner

AIRCRAFT LANDING

RELATED APPLICATION

This application claims priority to United Kingdom Patent Application GB1812301.8 filed Jul. 27, 2018, the entirety of which is incorporated by reference.

TECHNICAL FIELD

The present invention relates aircraft landing and particularly to detecting the proximity of an aircraft to the ground.

BACKGROUND

A system on an aircraft may be configured to issue an affirmative aircraft landing signal in response to a landing event occurring. For example, a landing event may begin when an aircraft is close to the ground and the pilot has visual contact with the runway, followed possibly by initial ground contact with one or more of the aircraft's tyres, then by sustained ground contact and, finally, when weight is increased on the wheels.

It is important to determine accurately when certain stages of an aircraft landing event have occurred. This is partly so that aircraft retardation functions can be deployed at an appropriate moment. Retardation functions may include one or more of thrust reversers, ground spoilers, wheel braking and/or lift dumpers, for instance, and may generally be referred to herein as 'braking'. A delay in accurately determining when the certain stages of an aircraft landing event has or have occurred may cause a delay in initiating retardation functions, which may in turn influence the stopping capability and/or distance of the aircraft. These factors may influence which airports certain aircraft can access, and/or place weight restrictions on certain aircraft that need to access certain airports, where, for example, the airports have a restricted runway length.

Some known aircraft landing systems are adapted to detect relative movement of certain landing gear elements to establish when ground contact has occurred. Such systems may be referred to as weight-on-wheel (WoW) detection systems using WoW detectors. As aircraft sizes are generally increasing, so too are the pre-loads used in aircraft suspension systems. As such, the time between an aircraft contacting the ground and an aircraft system detecting relative movement within a suspension system may increase. This may result in delayed aircraft braking, and the need for longer runways or the exclusion of some aircraft from operating in some airports.

SUMMARY

A first aspect of the present invention provides a system to detect aircraft ground proximity, the system comprising: a transmitter for transmitting a radio frequency signal along an extended landing gear of an aircraft; a sensor configured to detect a parameter of the radio frequency signal, and a controller configured to detect a change in the detected parameter on the basis of an output of the sensor, and to issue a landing signal when the change in the detected parameter meets a predetermined criterion, wherein the predetermined criterion is indicative of a certain aircraft ground proximity.

Optionally, the detected parameter is affected by contact between the extended landing gear and the ground, and the parameter meets the predetermined criterion upon contact between the extended landing gear and the ground, whereby the issued landing signal indicates zero distance between the aircraft and the ground.

Optionally, the transmitter is connected to the extended landing gear at a distance from a point of the aircraft from which the extended landing gear extends that is an odd-multiple of a quarter wavelength of the radio frequency signal.

Optionally, the extended landing gear is configured to act as a receiving antenna of the radio frequency signal transmitted by the transmitter and is configured, in use, to receive the radio frequency signal transmitted along the landing gear, and the sensor is configured to detect a parameter of the received radio frequency signal.

Optionally, the extended landing gear is a first extended landing gear, and wherein a second extended landing gear of the aircraft is configured to act as a receiving antenna of the radio frequency signal, wherein the sensor is associated with the second extended landing gear and is configured to detect a parameter of the radio frequency signal at the second extended landing gear, wherein the transmitter and the sensor are electrically connected only when the first extended landing gear and the second extended landing gear are both in contact with the ground, and wherein the controller is configured to issue the landing signal when it is determined, based on the output of the sensor, that both of the first and the second landing gears are in contact with the ground.

Optionally, the detected parameter comprises capacitance between the first extended landing gear and the second extended landing gear.

Optionally, the detected parameter comprises an electrical current between the transmitter and the sensor.

Optionally, the system comprises a coil positioned at a distal end of the extended landing gear, wherein the transmitter is configured to transmit the radio frequency signal along the landing gear and through the coil, wherein the detected parameter is a parameter related to the coil and is indicative of a distance between the coil and the ground, and wherein the controller is configured to issue the landing signal when it is determined that the parameter indicates that the distance between the coil and the ground meets a threshold distance.

Optionally, the transmitter is configured to generate an oscillating magnetic current in the coil when the radio frequency signal is transmitted through the coil, and the detected parameter comprises a rate of oscillation of the magnetic current.

Optionally, the transmitter is configured to generate a magnetic field around the coil, and the parameter is detectably changed when an electrically-conductive penetrates the magnetic field. Optionally, the parameter comprises a parameter of one or more eddy currents generated in the electrically-conductive object that penetrates the magnetic field.

Optionally, the detected parameter comprises an inductance of the coil.

Optionally, the coil is positioned on an underside of the landing gear, wherein the underside of the landing gear faces the ground when the landing gear is extended.

A second aspect of the present invention provides a system to detect aircraft landing, the system comprising a controller of an aircraft, the controller configured to determine whether a parameter of a radio frequency signal transmitted through part of the aircraft indicates that the proximity of the aircraft to the ground meets a threshold, and issue a landing signal when the threshold is met.

Optionally, the threshold is met only when the distance between the aircraft and the ground is zero.

A third aspect of the present invention provides an aircraft comprising a landing gear, at least one electrically-conductive tyre mounted on the landing gear; and a system according to the first or the second aspects of the present invention, wherein the landing gear of the aircraft is the extended landing gear of the system.

A fourth aspect of the present invention provides a method to detect aircraft ground proximity, the method comprising: transmitting a radio frequency signal along an extended landing gear, detecting a parameter related to the transmitted radio frequency signal, and issuing a landing signal when a change in the detected parameter meets a predetermined criterion, wherein the predetermined criterion is indicative of aircraft ground proximity.

Optionally, the method comprises transmitting the radio frequency signal from a point on the extended landing gear that is an odd-multiple of a quarter wavelength of the radio frequency signal from a body of the aircraft.

Optionally, the transmitting comprises transmitting the radio frequency signal through a coil at a distal end of the extended landing gear.

BRIEF DESCRIPTION OF THE DRAWINGS

Embodiments of the invention will now be described, by way of example only, with reference to the accompanying drawings, in which.

DETAILED DESCRIPTION

The following disclosure relates to apparatus and processes for detecting aircraft ground proximity during aircraft landing. For aircraft landing, the landing gears of the aircraft are in an extended position. In some aircraft, particularly light aircraft, one or more of the landing gears are fixed in an extended position throughout flight. In other aircraft, the landing gears are stowed in a retracted position during flight, and are moved to an extended position for landing, as is well-known in the art. The landing gears contact the ground upon landing and support the weight of the aircraft.

Unless otherwise stated, aircraft ground proximity is taken as the distance between the ground and the lowest part of a tyre mounted on a distal end of an extended landing gear. Systems according to the invention may be configured to also detect zero distance between the aircraft and the ground, for example when the tyre contacts the ground.

Embodiments of the present invention provide a system to detect aircraft landing. The system comprises a controller, such as the controller 130 shown in FIG. 1. The controller is configured to, in use, determine whether a parameter of a radio frequency signal transmitted through part of an aircraft indicates that a proximity of the aircraft to the ground meets a threshold, and issue a landing signal when the threshold is met. The threshold may be a predetermined distance between the aircraft and the ground. The threshold may be a distance of zero between the aircraft and the ground.

The landing signal issued by the controller may be sent to other aircraft systems, which may automatically activate aircraft retardation functions to reduce the velocity of the aircraft in response to the landing signal. The landing signal may be sent to the cockpit of the aircraft to indicate to the aircraft crew the proximity of the aircraft to the ground.

Figure 1:
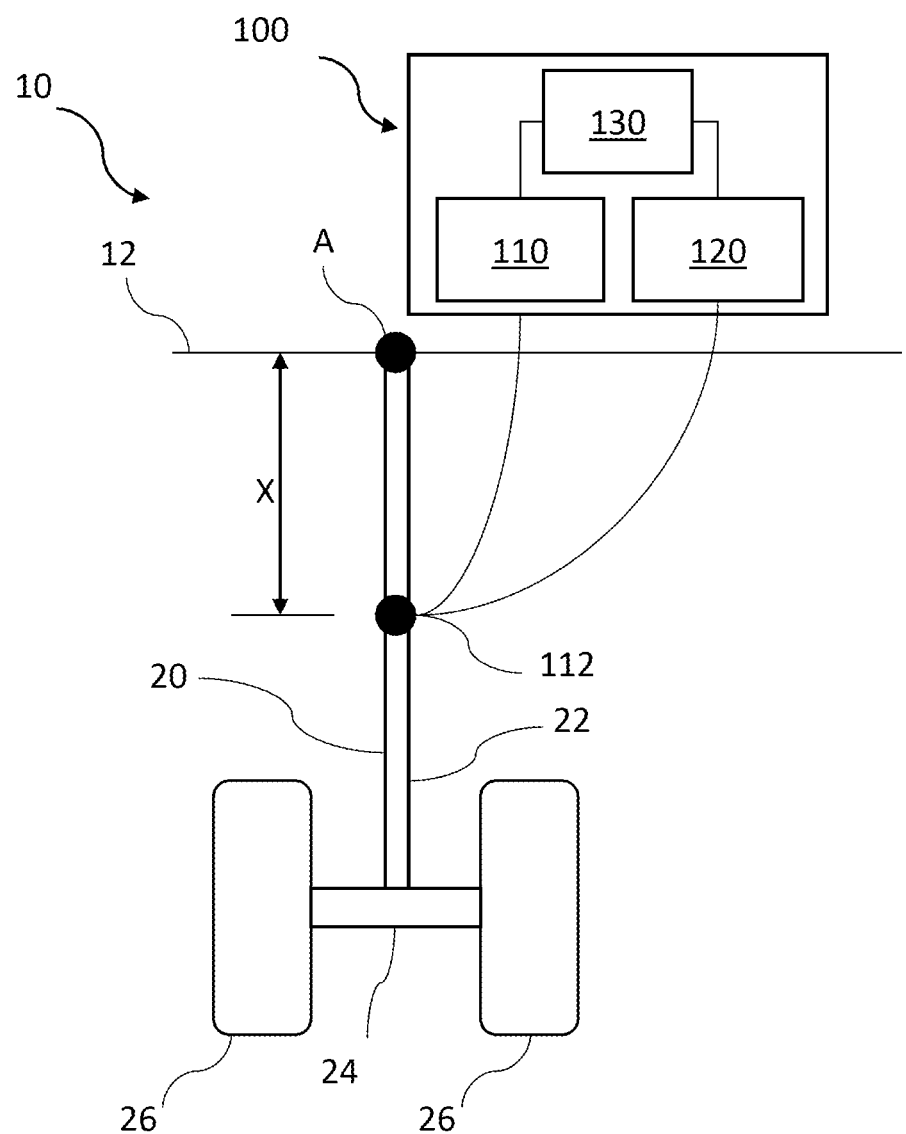
FIG. 1 shows a schematic view of a system according to an embodiment of the invention.

FIG. 1 illustrates a simplified diagram of a system 100 according to an embodiment of the invention. The system 100 is configured to detect aircraft ground proximity. In some embodiments, the system 100 is configured to detect that a distance between an aircraft 10 that comprises the system 100 and the ground is below certain threshold. In some embodiments, the system is configured to detect that the distance between the aircraft 10 and the ground is zero. The system 100 comprises a transmitter 110 for transmitting a radio frequency (RF) signal along an extended landing gear 20 of the aircraft 10. The radio frequency signal is an electric current that alternates as a radio frequency. The landing gear 20 is configured to act as a transmitting antenna of the RF signal. The system 100 comprises a sensor 120 configured to detect a parameter of the radio frequency signal transmitted by the transmitter 110. The parameter may be affected by the RF signal transmitted by the transmitter 110. The system comprises a controller 130 configured to detect a change in the parameter detected on the basis of an output of the sensor 120, and to issue a landing signal when the change in the detected parameter meets a predetermined criterion. The predetermined criterion is indicative of a certain aircraft ground proximity.

The aircraft landing gear 20 shown in FIG. 1 comprises a strut 22, a bogie 24 at a distal end of the landing gear 20 and one or more tyres 26 mounted to the bogie 24. In some embodiments, the landing gear 20 may not comprise a bogie 24, and the tyres 26 may be instead mounted to another structure at the distal end of the landing gear 20. The landing gear 20 extends from the aircraft body 12 from a point A. The tyres 26 are electrically-conductive, as is known in the art. In other embodiments, the aircraft landing gear may comprise skids instead of tyres 26. It is to be understood that reference to tyres when describing any embodiments of the present invention may equally apply to skids, wherein the "ground" is water. The landing gear 20 may be a nose landing gear or a main landing gear of the aircraft 10.

In some embodiments, the transmitter 110 is positioned on the landing gear 20, and may be at or near point 112. In other embodiments, as shown in FIG. 1, the transmitter 110 is physically located in the aircraft body 12 and is electrically connected to point 112, for example by an electrically-conductive wire or other electrically-conductive path. In some embodiments, the sensor 120 is positioned on the landing gear 20, and may be at or near point 112. In other embodiments, as shown in FIG. 1, the sensor 120 is physically located in the aircraft body 12 and is electrically connected to point 112, for example by an electrically-conductive wire or other electrically-conductive path.

In the embodiment shown in FIG. 1, the parameter detected by the sensor 120 is affected by contact between the extended landing gear 20 and the ground (not shown). The parameter meets the predetermined criterion upon contact between the extended landing gear and the ground whereby the issued landing signal indicates zero distance between the aircraft and the ground. In some embodiments, the parameter meets the predetermined criterion when at least one of the tyres 26 is in contact with the ground.

In the embodiment shown in FIG. 1, the landing gear 20 is configured to act as a transmitting antenna of the RF signal. That is, the landing gear 20 comprises an electrically conductive path between the point 112 at which the transmitter 110 is connected to the extended landing gear 20 and the tyres 26. The point 112 at which the transmitter 110 is connected to the extended landing gear 20 is at a distance X from the point A, from which the extended landing gear 20 extends from the aircraft body 12. In some embodiments, the distance X is substantially equal to any odd-multiple of a quarter wavelength of the RF signal, for example 1/4, 3/4, 5/4, 7/4 etc., which can be more generally defined as $X=(2y-1)\lambda/4$ wavelength, where y is an integer and $\lambda$ is the wavelength of the RF signal.

The point 112 being positioned at such a distance ($X=(2y-1)\lambda/4$) from the aircraft body 12 is significant because, in use, the RF signal transmitted by the transmitter 110 will be reflected off the aircraft body 12, rather than being conducted by the aircraft body 12. This can be advantageous. For example, the RF signal transmitted by the transmitter 110 may not disrupt other systems on the aircraft 10. For example, the RF signal may be transmitted only from the distal end of the landing gear 20, remote from point A.

Dependent on the type of aircraft 10 and the position of the landing gear 20 on the aircraft 10, the aircraft body 12 may, for example, be part of the wing of the aircraft 10 or the fuselage of the aircraft 10.

In some embodiments, the detected parameter comprises a frequency of the RF signal. The frequency may be affected by contact between at least one of the tyres 26 of the landing gear 20 at the ground because such contact changes the effective length of the antenna due to the electrically-conductive properties of the at least one tyre 26 and the ground. In some embodiments, the parameter detected by the sensor 120 may comprise the power of the RF signal. Because the tyres 26 are electrically-conductive, they conduct the RF signal, which is then conducted by the ground upon contact between at least one of the tyres 26 and the ground, thus changing the detected power of the RF signal.

In the embodiment shown in FIG. 1, the landing gear 20 is configured to act as a receiving antenna of the RF signal transmitted by the transmitter 110 and is configured, in use, to receive the radio frequency transmitted along the landing gear 20. The landing gear 20 may be configured to receive a reflection of the RF signal transmitted along the landing gear 20. In some embodiments, the sensor 120 is configured to detect a parameter of the reflected the RF signal received at the landing gear 20.

Figure 2:
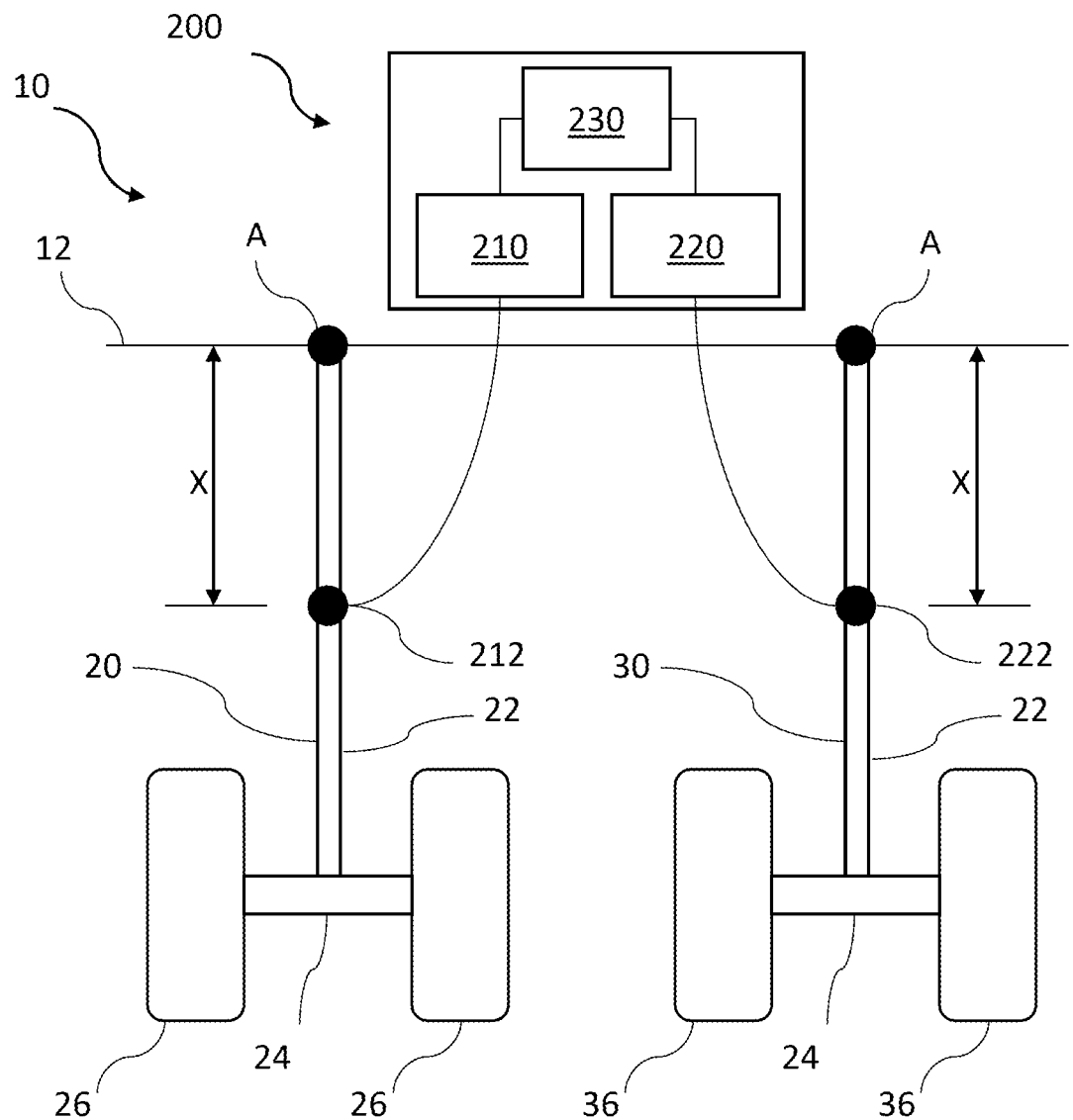
FIG. 2 shows a schematic view of a system according to an embodiment of the invention.

FIG. 2 illustrates a simplified diagram of a system 200 according to an embodiment of the invention. The system 200 is configured to detect that a distance between the aircraft 10 and the ground is zero. The system 200 comprises a transmitter 210, a receiver 220 and a controller 230 which are substantially the same as the transmitter 110, receiver 120 and controller 130 described with reference to FIG. 1, and will therefore not be described again in detail here.

The aircraft 10 shown in FIG. 2 comprises a first landing gear 20 and a second landing gear 30. The first landing gear 20 and the second landing gear 30 are on opposite sides of the aircraft 10. The first landing gear 20 is substantially the same as the landing gear 20 described above with reference to FIG. 1. The second landing gear is substantially the same as the first landing gear, and like features have been given corresponding reference numbers, but increased by 10, and corresponding letters. The system 200 comprises a transmitter 210, a sensor 220 and a controller 230. The second landing gear 30 is configured to act as a receiving antenna of the RF signal transmitted by the transmitter 210 along the first landing gear 20. The transmitter 210 and the sensor 220 are electrically connected only when the first extended landing gear 20 and the second extended landing gear 30 are both in contact with the ground. The controller 230 is configured to issue the landing signal when it is determined, based on the output of the sensor 220, that both of the first and the second landing gears 20, 30 are in contact with the ground.

The transmitter 210 shown in FIG. 2 is for transmitting an RF signal along the first landing gear 20. In some embodiments, the transmitter 210 is positioned on the first landing gear 20, and may be at point 212. In other embodiments, as shown in FIG. 2, the transmitter 210 is physically located in the aircraft body 12 and is electrically connected to point 212, for example by an electrically-conductive wire or other electrically-conductive path. The sensor 220 is configured to detect a parameter of the RF signal at a point 222 on the second landing gear 30. In some embodiments, the sensor 220 is positioned on the second landing gear 30, and may be at point 222. In other embodiments, as shown in FIG. 2, the sensor 220 is physically located in the aircraft body 12 and is electrically connected to point 222, for example by an electrically-conductive wire or other electrically-conductive path.

In some embodiments, the points 212, 222 are located on their respective landing gear 20, 30 at a distance X from the respective point A, from which the respective landing gear 20 extends from the aircraft body 12. In some embodiments, the distance X is substantially equal to any odd-multiple of a quarter wavelength of the RF signal, for example 1/4, 3/4, 5/4, 7/4 etc., which can be defined as $X=(2y-1)\lambda/4$, where y is an integer and $\lambda$ is the wavelength of the RF signal. In the embodiment shown in FIG. 2, the points 212, 222 are an equal respective distance X from the respective point A. In other embodiments, the points 212, 222 may be at differing distances from the respective point A compared to one another. The position of the points 212, 222 shown in FIG. 2 helps to prevent conduction of the RF signal transmitted by the transmitter 210 through the aircraft body 12. If the RF signal were conducted through the aircraft body 12, a parameter of the RF signal conducted through the aircraft body 12 would be detected by the sensor 220 and may not be affected by aircraft ground proximity.

The system 200 shown in FIG. 2 is configured so that the landing signal is issued by the controller 230 only when an electrical connection is made between the transmitter 210 and the sensor 220. The electrical connection is made when at least one of the tyres 26 of the first landing gear 20 and at least one of the tyres 36 of the second landing gear 30 make contact with the ground, so that the RF signal is conducted from the point 212 on the first landing gear 20, through the at least one tyre 26 of the first landing gear 20, through the ground, through the at least one tyre 36 of the second landing gear 30, and to the point 222, where a parameter of the RF signal is detected by the sensor 220.

In some embodiments, the sensor 220 is configured to measure capacitance. When the aircraft 10 is in flight, the sensed capacitance will have a different value compared to when a tyre 26, 36 on each of the landing gears 20, 30 is in contact with the ground. Any suitable sensor could be used, as known in the art. The predetermined criterion may be a threshold capacitance and/or a threshold change in capacitance, so that a measured capacitance meeting the predetermined criterion is indicative of aircraft ground contact. In some embodiments, the sensor 220 may be used in the same way, but may be configured instead to detect electrical current between the transmitter 210 and the sensor 220.

Figure 3:
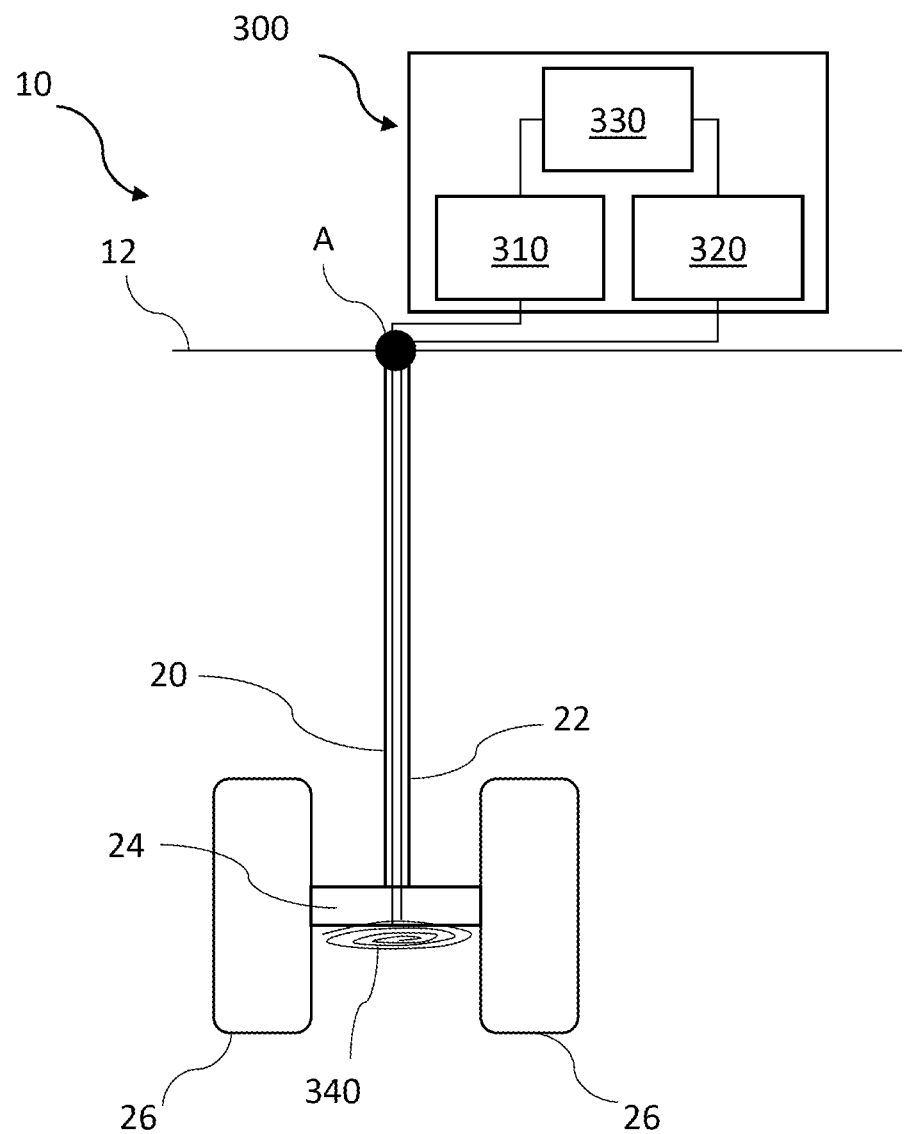
FIG. 3 shows a schematic view of a system according to an embodiment of the invention.

FIG. 3 illustrates a simplified diagram of a system 300 according to an embodiment of the invention. The system 300 is configured to detect aircraft ground proximity. In some embodiments, the system 300 is configured to detect that a distance between an aircraft 10 that comprises the system 300 and the ground is below certain threshold. In some embodiments, the system 300 is configured to detect that a distance between the aircraft 10 and the ground is zero. The system 300 comprises a transmitter 310 configured to transmit a RF signal along a landing gear 20 and through a coil 340 positioned at a distal end of the landing gear 20, remote from an aircraft body 12. The system 300 comprises a sensor 320 configured to detect a parameter related to the coil 340. The parameter is indicative of a distance between the coil 340 and the ground. A controller 330 comprised in the system 300 is configured to detect a change in the parameter detected by the sensor 320 and to issue a landing signal when it is determined that the parameter indicates that the distance between the coil 340 and the ground meets a threshold distance.

In some embodiments, the transmitter 310 and/or the sensor 320 are positioned on the landing gear 20. In other embodiments, as shown in FIG. 3, the transmitter 310 and/or the sensor 320 are physically located in the aircraft body 12 and are electrically connected to the landing gear 20, for example by an electrically-conductive wire or other electrically-conductive path.

In the embodiment shown in FIG. 3, the coil 340 is positioned on an underside of the landing gear 20. The underside of the landing gear 20 faces the ground when the landing gear 20 is extended. In the embodiment shown in FIG. 3, the underside of the landing gear 20 is an underside of the bogie 24. In other embodiments, the coil 340 may be positioned elsewhere on the landing gear 20.

Transmitting an RF signal from the transmitter 310 to the coil 340 generates a magnetic field around the coil 340. In some embodiments, as the aircraft 10 approaches the ground, the generated magnetic field penetrates the electrically-conductive ground, which detectably changes the parameter related to the coil 340 that is detected by the sensor 320. In some embodiments, the parameter comprises an inductance of the coil 340.

In some embodiments, the magnetic field induces eddy currents in conductive materials that penetrate the magnetic field. For example, eddy currents may be induced in a portion of the landing gear 20 adjacent to the coil 340. The eddy currents in the landing gear 20 may be affected by contact between at least one of the tyres 26 and the ground. By way of further example, eddy currents may be induced in the ground as the aircraft 10 approaches the ground. The eddy currents in the ground may be affected by the proximity of the aircraft 10 to the ground. In such embodiments, the parameter may comprise a parameter of the eddy currents in the landing gear 20 and/or the ground.

In some embodiments, the transmitter 310 causes the generation of an oscillating magnetic current in the coil 340 when the RF signal is transmitted through the coil 340. The detected parameter may comprise a rate of oscillation of the magnetic current. In other embodiments, the parameter may comprise current in the coil 340.

In some embodiments, the threshold distance may be set so that the landing signal is issued after ground contact and before the full weight of the aircraft 10 is taken by the wheels. When the aircraft is stationary on the ground, the tyres deflect under the weight of the aircraft, meaning that the coil 340 is closer to the ground than at initial contact between the aircraft and the ground. At the moment when the aircraft tyres 26 make contact with the ground, a majority of the aircraft weight may still be lifted by the wings. The tyres 26 therefore do not necessarily fully deflect immediately upon initial ground contact. In some embodiments, the threshold distance may be set so that the landing signal is issued before the aircraft 10 is in contact with the ground, but when it is detected that ground contact is imminent. For example, the threshold distance may be set as up to 0.1 m, 0.2 m or 0.5 m greater than a vertical distance between the coil 340 and the bottom of the tyres 26. Such embodiments can help to account for a delay between issue of the landing signal and the activation of aircraft retardation functions.

Figure 4:
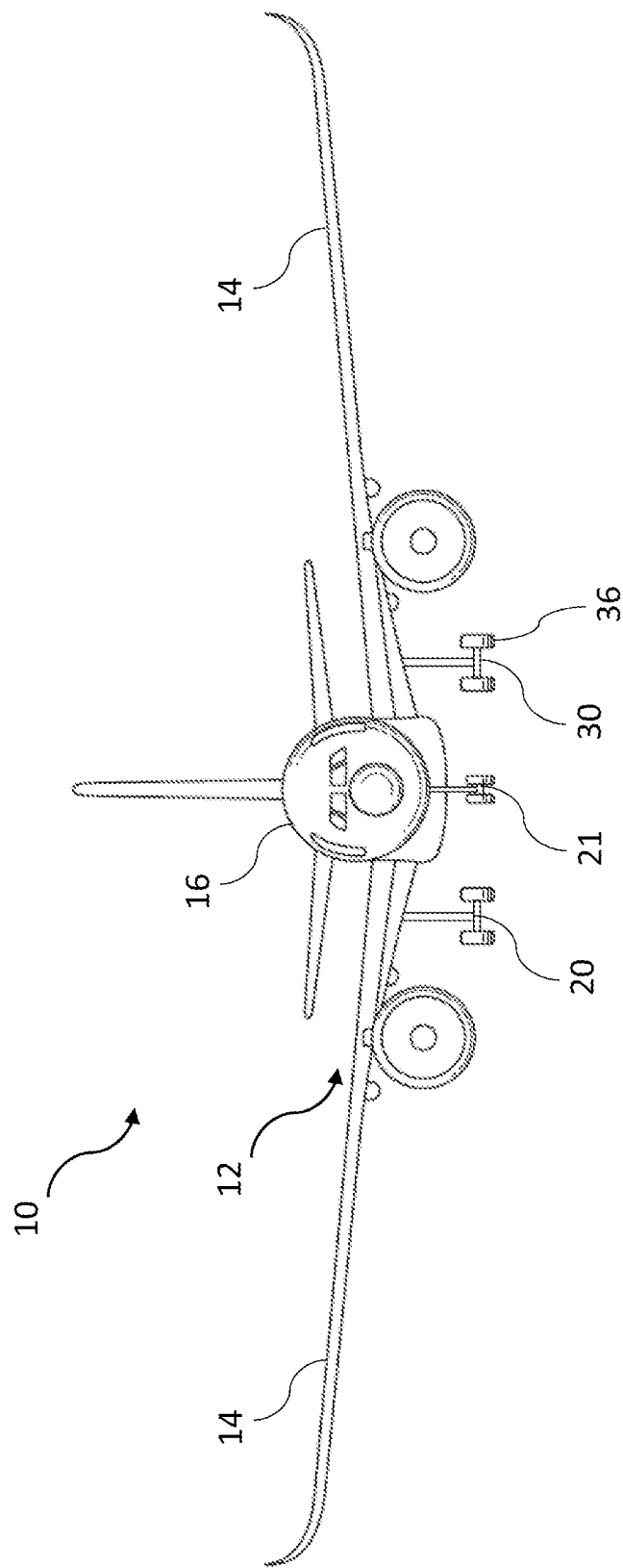
FIG. 4 shows a schematic view of an aircraft according to an embodiment of the invention.

FIG. 4 is a schematic diagram of an aircraft 10 according to an embodiment of the invention. The aircraft 10 comprises wings 14, a fuselage 16, two main landing gears 20, 30 and a nose landing gear 21. Upon each landing gear 20, 21, 30 is mounted at least one electrically-conductive tyre 21, 26, 36. In the embodiment shown in FIG. 4, the main landing gears 20, 30 extend from the aircraft wings 14 and the nose landing gear 21 extends from the fuselage 16.

The aircraft 10 comprises one or more systems according to embodiments of the invention, such as the systems 100, 200, 300 described with reference to FIGS. 1-3. In embodiments in which the landing gear of the system according to an embodiment of the invention is a main landing gear 20, 30 the aircraft body 12 may be a respective wing 14 of the aircraft 10. In other embodiments, the main landing gear 20, 30 may extend from the aircraft fuselage 16. In embodiments in which the landing gear of the system according to an embodiment of the invention is the nose landing gear 21, the aircraft body 12 is the aircraft fuselage 16.

In some embodiments, the aircraft 10 comprises a first system 100 and a second system 200, one or each of which embodying the invention, and other aircraft systems (not shown) are configured to activate aircraft retardation functions only when both the first and second systems 100, 200 have issued a landing signal. In some embodiments, the first and second systems 100, 200 have a common controller configured to issue a landing signal only when it is determined that the predetermined criterion for each system 100, 200 has been met. This can help to prevent premature activation of aircraft retardation functions, which may occur due to an incorrect reading by one of the systems 100, 200. In some embodiments, the aircraft comprises two systems 100 embodying the invention, each of the systems 100 being associated with a respective one of the main landing gears 20. In some such embodiments, the transmitters 110 of each system 100 may be configured to transmit RF signals of different frequencies to one another and/or to transmit RF signals that are phase shifted relative to one another, to help prevent interference between the two systems 100. In some embodiments, the two systems 100 may have a common controller 110 configured to issue a landing signal only when it is determined that the predetermined criterion for each system 100 has been met.

Figure 5:
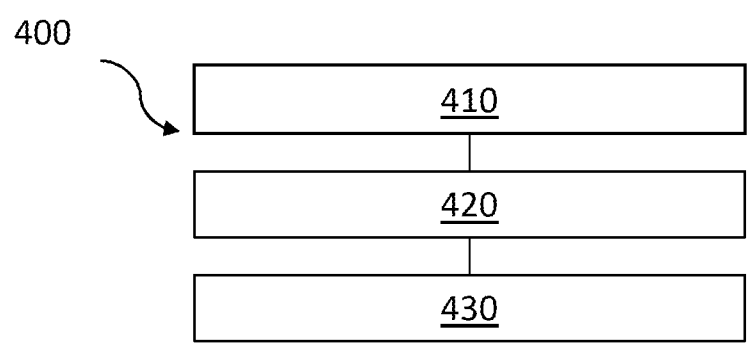
FIG. 5 is a flow diagram depicting a method according to an embodiment of the invention.

FIG. 5 is a flow diagram showing a method 400 according to an embodiment of the present invention. Parts of the method 400 shown in dashed boxes are optional parts of the method 400. The method 400 comprises: transmitting 410 an RF signal along an extended aircraft landing gear, detecting 420 a parameter related to the transmitted RF signal; and issuing 430 a landing signal when a change in the detected parameter meets a predetermined criterion. The predetermined criterion is indicative of aircraft ground proximity. In some embodiments, the predetermined criterion may be indicative of zero distance between the aircraft and the ground.

In some embodiments, the transmitting 410 and the detecting 420 occur only when the aircraft landing gear is in an extended position. In some embodiments, the transmitting 410 and the detecting 420 are initiated when the altitude of the aircraft falls below an altitude threshold, or when the speed of the aircraft falls below a speed threshold.

The method 400 may be performed by a system according to an embodiment of the invention, for example a system 100, 200, 300 described with reference to any one of FIGS. 1-3. The transmitting 410 may be performed by a transmitter 110, 210, 310, which may be positioned on the extended aircraft landing gear or may be positioned within a body of the aircraft, such as the wing or fuselage of the aircraft. The detecting 420 may be performed by a sensor 120, 220, 320. The issuing 430 may be performed by a controller 130, 230, 330.

In some embodiments, the method 400 comprises transmitting 410 the RF signal from a point on the extended aircraft landing gear that is an odd-multiple of a quarter wavelength of the RF signal from point from which the landing gear extends from a body of the aircraft, for example 1/4, 3/4, 5/4, 7/4 etc., which can be defined as $(2y-1) \lambda/4$, where y is an integer and $\lambda$ is the wavelength of the RF signal.

In some embodiments, the transmitting 410 comprises transmitting 410 the RF signal through a coil at a distal end of the extended landing gear. The coil may be on an underside of a bogie of the landing gear. Such a method 400 may be performed by a system 300 according to an embodiment of the invention.

Some embodiments of the invention comprise an aircraft, such as the aircraft 10 shown in FIG. 4, configured to perform the method 400. In some embodiments, the aircraft comprises wings, a fuselage, two main landing gears and a nose landing gear. Upon at least one of the landing gears is mounted at least one electrically-conductive tyre. In some embodiments, the aircraft comprises a transmitter to transmit an RF signal along a landing gear of the aircraft, a receiver to detect a parameter related to the transmitted RF signal, and a controller to issue the landing signal when a change in the detected parameter meets a predetermined criterion.

It is to be noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. A system to detect aircraft ground proximity, the system comprising:
    a transmitter configured to be on an aircraft and configured to transmit a radio frequency signal as an electric current along an extended landing gear of the aircraft, wherein the extended landing gear forms a transmitting antenna of the radio frequency signal, and wherein the extended landing gear is a retractable landing gear;
    a sensor configured to be on the aircraft and configured to detect a parameter of the transmitted radio frequency signal, and
    a controller configured to be on the aircraft and configured, based on an output of the sensor, to issue a landing signal when the detected parameter or a change, detected by the controller, in the detected parameter meets a predetermined criterion, wherein the predetermined criterion is indicative of a certain aircraft ground proximity.

2. The system according to claim 1, wherein the detected parameter is affected by contact between the extended landing gear and the ground, and
    wherein the parameter or the change in the detected parameter meets the predetermined criterion upon contact between the extended landing gear and the ground, whereby the issued landing signal indicates zero distance between the aircraft and the ground.

3. The system according to claim 1, wherein the transmitter is connected to the extended landing gear at a distance from a point of the aircraft from which the extended landing gear extends that is an odd-multiple of a quarter wavelength of the radio frequency signal.

4. The system according to claim 3, wherein the extended landing gear is configured to act as a receiving antenna of the radio frequency signal transmitted by the transmitter and is configured, in use, to receive the radio frequency signal transmitted along the landing gear, and
    wherein the sensor is configured to detect a parameter of the received radio frequency signal.

5. The system according to claim 2, wherein the extended landing gear is a first extended landing gear, and wherein a second extended landing gear of the aircraft is configured to act as a receiving antenna of the radio frequency signal,
    wherein the sensor is associated with the second extended landing gear and is configured to detect a parameter of the radio frequency signal at the second extended landing gear,
    wherein the transmitter and the sensor are electrically connected only when the first extended landing gear and the second extended landing gear are both in contact with the ground, and
    wherein the controller is configured to issue the landing signal when it is determined, based on the output of the sensor, that both of the first and the second landing gears are in contact with the ground.

6. The system according to claim 5, wherein the detected parameter comprises capacitance between the first extended landing gear and the second extended landing gear.

7. The system according to claim 5, wherein the detected parameter comprises an electrical current between the transmitter and the sensor.

8. A system to detect aircraft ground proximity, the system comprising:
    a transmitter configured to be on an aircraft and configured to transmit a radio frequency signal as an electric current along an extended landing gear of the aircraft and through a coil positioned at a distal end of the extended landing gear, wherein the extended landing gear is a retractable landing gear;
    a sensor configured to be on the aircraft and configured to detect a parameter related to the coil, the detected parameter indicative of a distance between the coil and the ground; and a controller configured to be on the aircraft and configured, based an output of the sensor, to issue a landing signal when the detected parameter, or a change in the detected parameter, indicates that the distance between the coil and the ground meets a threshold distance.

9. The system according to claim 8, wherein the transmitter is configured to generate an oscillating magnetic current in the coil when the radio frequency signal is transmitted through the coil, and
wherein the detected parameter comprises a rate of oscillation of the magnetic current.

10. The system according to claim 8, wherein the detected parameter comprises an inductance of the coil.

11. The system according to claim 8, wherein the coil is positioned on an underside of the landing gear, wherein the underside of the landing gear faces the ground when the landing gear is extended.

12. A system to detect aircraft landing, comprising:
a controller of an aircraft, the controller is configured to:
determine whether a parameter of a radio frequency signal transmitted as an electric current through an extended landing gear of the aircraft indicates that a proximity of the aircraft to the ground meets a threshold, wherein the extended landing gear is a retractable landing gear and the extended landing gear forms a transmitting antenna for the radio frequency signal by conducting the electrical current along the extended landing gear, and
issue a landing signal when the threshold is met.

13. The system according to claim 12, wherein the threshold is met only when a distance between the aircraft and the ground is zero.

14. An aircraft comprising a landing gear including: at least one electrically-conductive tire; and
a system according to claim 1, wherein the landing gear of the aircraft is the extended landing gear of the system.

15. A method to detect aircraft ground proximity, the method comprising:
transmitting a radio frequency signal as an electrical current along an extended landing gear, wherein the radio frequency signal is transmitted by the extended landing gear which forms a transmitting antenna by conducting the electrical current along the extended landing gear, wherein the extended landing gear is a retractable landing gear;
detecting onboard the aircraft a parameter of the transmitted radio frequency signal, and
issuing a landing signal when the detected parameter or a change in the detected parameter meets a predetermined criterion, wherein the predetermined criterion is indicative of aircraft ground proximity.

16. The method according to claim 15, wherein the transmission of the radio frequency signal is from a point on the extended landing gear that is an odd-multiple of a quarter wavelength of the radio frequency signal from a body of the aircraft.

17. A method to detect aircraft ground proximity, the method comprising:
transmitting a radio frequency signal as an electrical current along an extended landing gear and through a coil at a distal end of the extended landing gear, wherein the extended landing gear is a retractable landing gear;
detecting onboard the aircraft a parameter related to the coil, the detected parameter indicative of a distance between the coil and the ground; and
issuing a landing signal when the detected parameter indicates that the distance between the coil and the ground meets a threshold distance.

18. The system according to claim 1, wherein the extended landing gear is configured to act as a receiving antenna of the radio frequency signal transmitted by the transmitter and is configured to receive a reflection from the ground of the radio frequency signal transmitted along the landing gear, and
wherein the detected parameter is the reflection of the received radio frequency signal.

19. The method according to claim 15, wherein the landing gear comprises a tire.

20. A system to detect aircraft landing comprising a controller of an aircraft, the controller is configured to:
determine whether a parameter of a radio frequency signal transmitted as an electric current along an extended landing gear of the aircraft indicates that a proximity of the aircraft to the ground meets a threshold, wherein the extended landing gear is a retractable landing gear and the electric current is transmitted along the landing gear towards a coil at a distal end of the extended landing gear; and
issue a landing signal when the threshold is met.

* * * * *